United States Patent [19]
MacKenty et al.

[11] Patent Number: 6,085,161
[45] Date of Patent: *Jul. 4, 2000

[54] SYSTEM AND METHOD FOR AUDITORIALLY REPRESENTING PAGES OF HTML DATA

[75] Inventors: Edmund R. MacKenty, Watertown; David E. Owen, Groton; Barry M. Arons, Waltham; Marshall W. Clemens, Lincoln, all of Mass.

[73] Assignee: Sonicon, Inc., Watertown, Mass.

[ * ] Notice: This patent is subject to a terminal disclaimer.

[21] Appl. No.: 09/274,516

[22] Filed: Mar. 23, 1999

Related U.S. Application Data

[63] Continuation of application No. PCT/US98/22235, Oct. 21, 1998.
[51] Int. Cl.[7] .................................................. G10L 13/00
[52] U.S. Cl. ........................ 704/270; 704/258; 704/260
[58] Field of Search .................................. 704/270, 275, 704/258, 260

[56] References Cited

U.S. PATENT DOCUMENTS

| | | | |
|---|---|---|---|
| 5,587,902 | 12/1996 | Kugimiya | 704/2 |
| 5,594,809 | 1/1997 | Kopec et al. | 382/161 |
| 5,748,186 | 5/1998 | Raman | 345/302 |

OTHER PUBLICATIONS

Klatt, "Review of text–to–speech conversion for English," J. Acoust. Soc. Am., vol. 82, No. 3, Sep. 1987, pp. 737–793.

*Primary Examiner*—David D. Knepper
*Attorney, Agent, or Firm*—Perkins, Smith & Cohen, LLP; Jacob N. Erlich, Esq.; Jerry Cohen, Esq.

[57] ABSTRACT

Representing HTML documents audibly includes the steps of assigning (214) unique sounds to HTML tags and events encountered in an HTML document, producing the associated sounds whenever those tags or events are encountered (218), and representing encountered text as speech (220). Speech and non-speech sounds may be produced simultaneously or substantially simultaneously. A corresponding system (10) is also disclosed.

17 Claims, 2 Drawing Sheets

SYSTEM AND METHOD FOR AUDITORIALLY REPRESENTING PAGES OF HTML DATA

"This application is a continuation division of international application number PCT U.S. Pat. No. 98/22235, filed Oct. 21, 1998 (status, abandoned, pending, etc.)."

BACKGROUND OF THE INVENTION

This invention relates generally to the World Wide Web, and, more particularly to communicating by sound the contents of Web pages coded in HTML.

The World Wide Web ("the Web") is an international collection of pages of data. Each page of data is written using the Hypertext Markup Language (HTML). Documents coded using HTIML include both plain text and markup text, the latter of which is generally referred to as a "tag." Tags in an HTML document are not displayed to viewers of the document; tags represent meta-information about the document such as links to other HTML pages, links to files, or special portions of the HTML page such as body text or headline text. Special text is typically displayed in a different color, font, or style to highlight it for the viewer.

Because of the visual nature of the medium, the Web presents special problems for visually-impaired individuals.

Further, not only are those individuals excluded from viewing content displayed by an HTML page, but traditional forms of representing visual data for consumption by visually-impaired individuals cannot conveniently accommodate the rich set of embedded functionality typically present in an HTML page.

It is therefore an object of this invention to provide a method and apparatus which makes HTML pages accessible to visually-impaired individuals.

It is a further object of this invention to provide a method and apparatus which represents the contents of an HTML page with sound data rather than visual data.

SUMMARY OF THE INVENTION

The objects set forth above as well as further and other objects and advantages of the present invention are achieved by the embodiments of the invention described hereinbelow.

The present invention presents HTML documents to the user as a linear stream of audio information. The division of text into lines on a page used by visual representations of documents is avoided. This differs from the existing systems, called "screen readers," that use synthesized speech output to represent information on a computer screen. Such screen readers depend upon the screen layout of a document, and require the user to understand and follow that layout to navigate within a document. The present invention avoids the visual metaphor of a screen and represents documents the way they would sound when read aloud, not the way they appear visually. That is, the present invention presents documents to users in a linear fashion, yet allows users to skip to other sections or paragraphs within the document at any time. The user interacts with documents using their semantic content, not their visual layout.

The present invention works with a browser utility, that is, an application for visually displaying HTML documents, to present HTML documents to computer users auditorially, instead of visually. It parses HTML documents, associates the markup and content with various elements of an auditory display, and uses a combination of machine-generated speech and non-speech sounds to represent the documents auditorially to a user.

Synthetic speech is used to read the text content aloud, and non-speech sounds to represent features of the document indicated by the markup. For example, headings, lists, and hypertext links can each be represented by distinct non-speech sounds that inform the user that the speech they are hearing is part of a header, list or hypertext link, respectively.

Thus, an HTML page can be read aloud using a speech synthesis device, while embedded HTML tags are simultaneously, or substantially simultaneously, displayed auditorially using non-speech sounds to indicate the presence of special text.

Sounds may be assigned to specific HTML tags and managed by a sonification engine. One such sonification engine is the Auditory Display Manager (ADM), described in co-pending application Ser. No. 08/956,238, filed Oct. 22, 1997, the contents of which are incorporated herein by reference.

The present invention also allows the user to control the presentation of the document. The user can: start and stop the reading of the document; jump forward or backwards by phrases, sentences, or marked up sections of the document; search for text within the document; and perform other navigational actions. They can also follow hotlinks to other documents, alter the rate at which documents are read or adjust the volume of the output. All such navigation may be performed by pressing keys on a numeric keypad, so that the invention can be used over a telephone or by visually impaired computer users who cannot effectively use a pointing device.

In one aspect, the present invention relates to a method of representing HTML documents auditorially. The method includes the steps of assigning a unique sound to an HTML tag type encountered in a page. Whenever an HTML tag of that type is encountered in the HTML page, the associated sound is produced. Speech is also produced that represents the text encountered in the HTML page. The speech and non-speech sounds can occur substantially simultaneously so that text representing a particular type of tag, such as a link to another HTML page, is read aloud in conjunction with another sound, such as a hum or periodic click.

In another aspect, the present invention relates to a system for representing HTML documents auditorially. In this aspect, documents are accepted from a browser utility.

However, as noted above, such browsers generally present the HTML document only visually, and use sound only to play recorded audio files that may also be obtained from the Web. In this aspect the invention includes a parser and a reader. The parser receives an HTML page and outputs a tree data structure that represents the received HTML page. The reader uses the tree data structure to produce sound representing the text and tags contained in the HTML page. In some embodiments, the reader produces the sound by performing a depth-first traversal of the tree data structure.

In another aspect, the present invention relates to an article of manufacture that has computer-readable program means embodied thereon. The article includes computer-readable program means for assigning a unique sound to an HTML tag encountered in a page, computer-readable program means for producing the assigned sound whenever the HTML tag is encountered, and computer-readable program means for producing speech representing text encountered in an HTML page.

For a better understanding of the present invention, together with other and further objects thereof, reference is made to the accompanying drawings and detailed description and its scope will be pointed out in the appended claims.

DETAILED DESCRIPTION OF THE PREFERRED EMBODIMENTS

Figure 1:
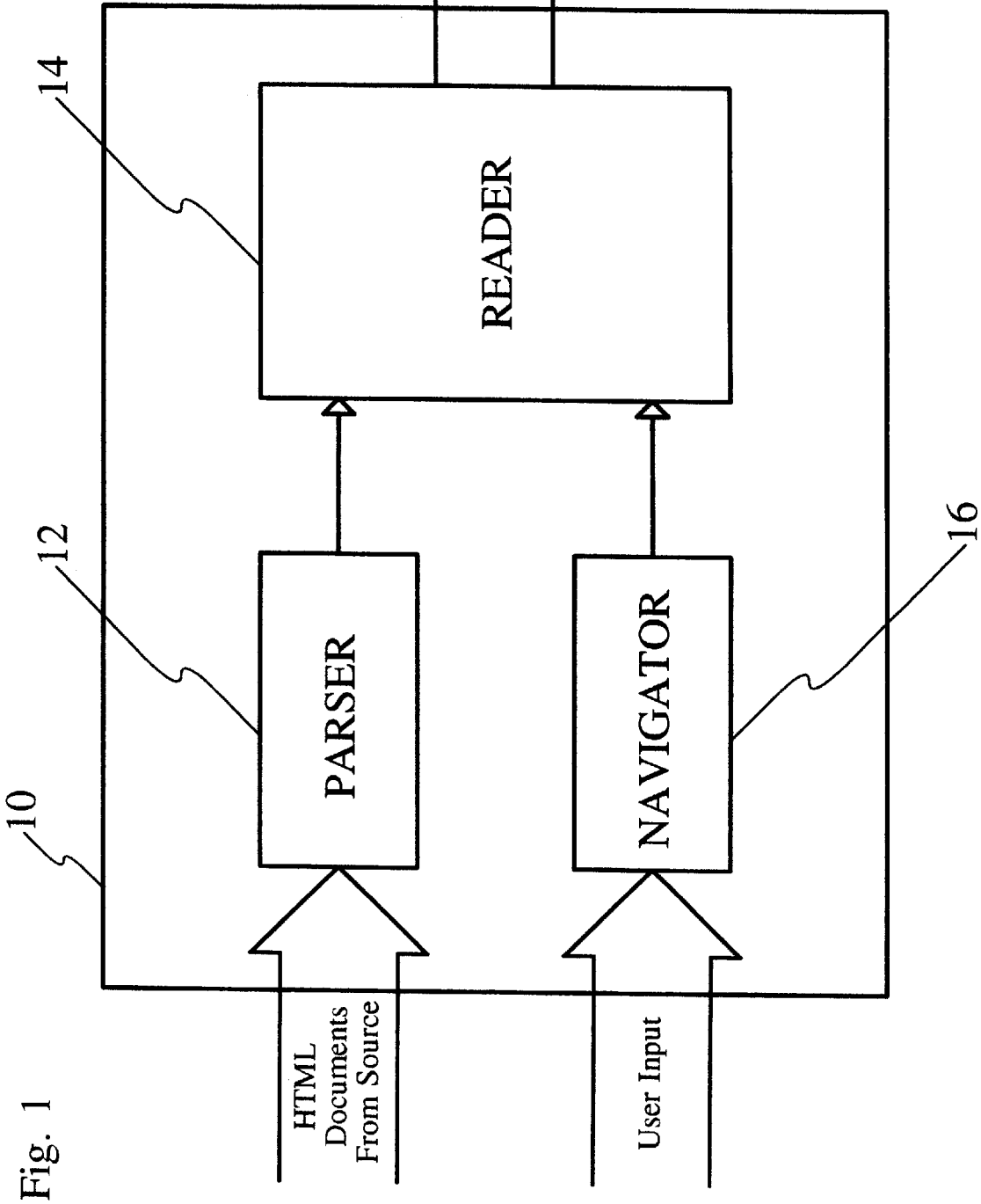
FIG. 1 is a block diagram of a sonification device.

Throughout the specification the term "sonify" will be used as a verb to refer to reading HTML pages aloud while including audible cues identifying HTML tags embedded in the page. Referring now to FIG. 1, an HTML page sonification apparatus 10 includes a parser 12, a reader 14, and a navigator 16. The parser 12 determines the structure of an HTML document to be sonified, the reader 14 sonfies an HTML document and synchronizes speech and non-speech sounds, and the navigator accepts input from the user allowing the user to select portions of the HTML document to be sonified. The operation of the parser 12, the reader 14, and the navigator 16 will be considered in greater detail below.

Figure 2:
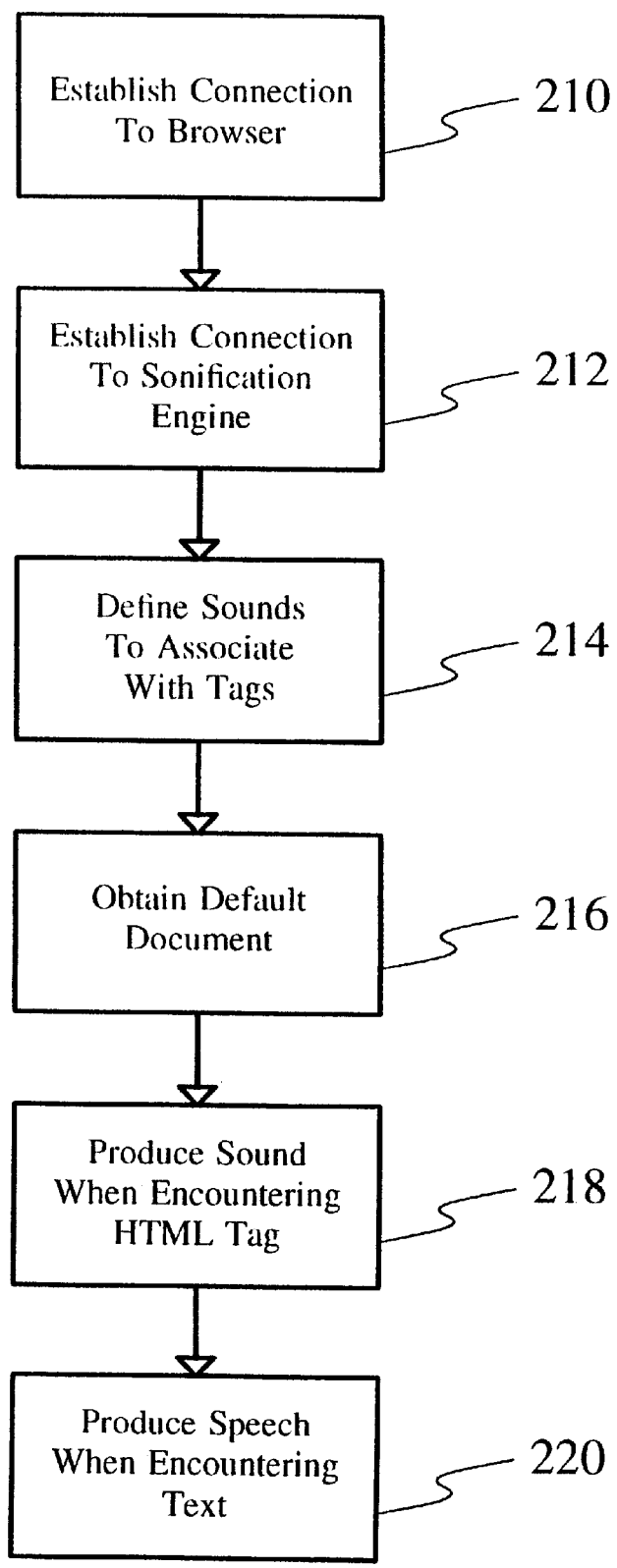
FIG. 2 is a flow diagram of the steps to be taken to initialize a sonification device.

Referring now to FIG. 2, the sonification device 10 initializes the various components in order to set up connections with a sonification engine (not pictured in FIG. 1) and a speech synthesis device (not pictured in FIG. 1). The initialization phase consists of four parts: establishing a connection to a browser utility that provides HTML documents to the invention (step 210); establishing a connection to the sonification engine (step 212);

defining the non-speech sounds and conditions under which each is used within the sonification engine (step 214), and obtaining the default HTML document (step 216).

Establishing a connection to the browser utility (step 210) will vary depending upon the browser to which a connection will be made. In general, some means of selecting the browser utility must be provided that defines an interface for requesting HTML documents by their Uniform Resource Locator (URL) and accepting the returned HTML documents. For example, if the sonification device 10 is intended to work with NETSCAPE NAVIGATOR, a browser utility manufactured by Netscape Communications, Inc. of Mountain View, California, the sonification device 10 may be provided as a plug-in module which interfaces with the browser. Alternatively, if the sonification device 10 is intended to work with INTERNET EXPLORER, a browser utility manufactured by Microsoft Corporation of Redmond, Washington, the sonification device 10 may be provided as a plug-in application designed to interact with INTERNET EXPLORER.

Establishing a connection to the sonification engine (step 212) generally requires no more than booting the engine.

For embodiments in which the sonification engine is provided as a software module, the software module should be invoked using whatever means is provided by the operating system to do so. Alternatively, if the sonification engine is provided as firmware or hardware, then the engine can be activated using conventional techniques for communicating with hardware or firmware, such as applying an electrical voltage to a signal line to indicate the existence of an interrupt request for service or by writing a predetermined data value to a register that indicates a request for the engine to service. Once connected, the sonification engine's initialization function is invoked, which causes the engine to allocate the resources it requires to perform its functions. This usually consists of the allocation of an audio output device and, in some embodiments, an audio mixer.

Once a connection to the sonification engine has been established, sounds must be associated with various events and objects that the sonification device 10 wishes the sonification engine to sonify (step 214). For example, auditory icons may be assigned to HTML tags, transitions between HTML tags, and error events. Auditory icons are sounds used to uniquely identify those events and objects. The sonification engine may do this by reading a file that lists various HTML tags and the actions to be performed when the HTML reader enters, leaves, or is within each tag. In one embodiment, the sonification engine reads a file that includes every HTML tag and event that may be encountered when sonifying an HTML file. In another embodiment, the sonification engine provides a mechanism allowing a newly encountered tag or event to be assigned a auditory icon. In this embodiment, the assignment of a auditory icon may take place automatically or may require user prompting.

Initialization ends with requesting the software module that provides HTML documents for a default HTML document, e.g. a "home page" (step 216). If a home page exists, it is passed to the sonification device 10 to be sonified. If there is no home page, the sonification device 10 waits for input from the user.

In operation, the device 10 instructs the sonification engine to produce, alter or halt sound data when encountering an HTML tag depending on the type of HTML tag (step 218) and instructs the speech synthesizer to produce speech data when encountering text (step 220).

The Parser

Referring back to FIG. 1, the HTIML document received from the browser utility, or some other utility program capable of providing HTML documents, is parsed into a tree data structure by the parser 12. The general process of parsing a document to produce a tree data structure is readily understood by one of ordinary skill in the art.

In one embodiment, the parser 12 produces a tree data structure in which each node of the tree represents an HTML tag whose descendants constitute the portion of the document contained within that tag. In this embodiment, the attributes and values of each tag are attached to the node representing that tag. The parent node of each node represents the HTML tag that encloses the tag represented by that node. The child nodes of each node represent the HTML tags that are enclosed by the tag represented by that node. Character data, which is the textual part of the document between the HTML tags, are represented as leaf nodes of the tree. Character data can be split into multiple nodes of the tree at sentence boundaries, and very long sentences may be further divided into multiple nodes to avoid having any single node containing a large amount of text.

The parser 12 may store the tree data structure that it generates in a convenient memory element that is accessible by both the parser 12 and the reader 14. Alternatively, the parser 12 may communicate the tree data structure directly to the reader 14.

The Reader

After an HTML document is obtained and parsed by the parser 12, the reader 14 accesses the tree data structure in order to sonify the page of HTML data that the tree data structure represents. In some embodiments the reader 14 accesses a separate memory element which contains the tree, while in other embodiments the reader 14 provides a memory element in which the tree structure is stored. The reader 14 traverses the tree data structure, representing encountered text as spoken words using a speech synthesizer and HTML tags using non-speech sounds. In some embodiments, the reader 14 coordinates with a separate speech synthesis module to represent text. The reader 14 interfaces with the sonification engine in order to produce non-speech sound representing HTML tags and events that must be sonified.

The HTML document is read by performing a depth-first traversal of the parsed HTML document tree. Such a traversal corresponds to reading the unparsed HTML document linearly, as it was written by its author. As each node of the tree is entered, the reader 14 examines its type. If the node contains character data, then the text of that character data is enqueued within the speech synthesizer so that it will be spoken. If the node is an HTML tag, then the element name, or label, of that tag is enqueued within the sonification engine, so that it will be represented by the sound associated with that tag during initialization. Regardless of the type of node, a marker is enqueued with the speech synthesizer to synchronize the two output streams as described below. As each node of the tree is exited, the reader sends the element names of HTML tags to the sonification engine so that it can represent the end of that tag in sound as well.

The reader maintains two cursors as it traverses the tree data structure. A cursor is a reference to a particular position, or node, within the tree. The first cursor represents the position within the parsed HTML document tree which is currently being sonified, and will be referred to as the "read cursor". The second cursor represents the position which will next be enqueued in the speech synthesizer or sonification engine, and will be referred to as the "enqueue cursor". The portion of the document between these two cursors is what has been enqueued for reading but has not yet been sonified. Other cursors may be used to represent other positions, or nodes, with the tree as needed, such as when searching the document for a particular text string or HTML tag. Cursors may be used to interactively control the position of the HTML document being read aloud.

The use of cursors in the HTML document allows the reader to move linearly throughout the document, following the text the way a person would read it. This differs from visual representations of HTML documents, which present the entire page and permit the user to scroll it horizontally or vertically, but provide no means of traversing the document in the manner in which it would be read. Using cursors provides the invention with a means of reading the document linearly, and allowing the user to navigate within the document as described below.

When the sonification device 10 begins the process of reading an HTML document to the user, both cursors are initially at the beginning of the document. That is, the cursors are at the root node of the parsed HTML document tree. The device 10 enqueues data from the parsed tree as described above. As each node of the tree is enqueued, the enqueue cursor is moved through the tree so that it always refers to the node that is to be enqueued next. When an HTML document is first parsed and presented to the reader, a cursor is placed at the top of the parsed tree structure and the entire HTML document is read from beginning to end as the cursor is moved through the tree. When the end of the document is reached, the system will stop reading and wait for input from the user. If input is received while the HTML document is being read, the reader 14 immediately stops reading, processes the input (which may change the current reading position), and then begins reading again, unless the input instructs the user to stop.

The markers enqueued in the speech synthesizer along with the text are associated with positions in the HTML tree. Each marker contains a unique identifier, which is associated with the position of the .enqueue cursor at the time that marker was enqueued. As the synthesizer reads the text enqueued in it, it notifies the Reader 14 as it encounters the markers enqueued along with the text. The Reader 14 finds the associated cursor position and moves the read cursor to that position. In this way, the read cursor is kept synchronized with the text that has been spoken by the speech synthesizer.

While the system is in the process of enqueuing data to the speech synthesizer and the sonification engine, the two cursors diverge as the enqueue cursor is moved forward within the HTML document tree. In order to avoid overflowing the queues within the speech synthesizer or sonification engine, the system may stop enqueuing data once the two cursors have diverged by a predetermined amount. As the speech synthesizer reads text to the user, and the notifications from it cause the system to advance the read cursor, the divergence between the two cursors becomes smaller. When it is smaller than a predetermined size, the system resumes enqueueing data to the speech synthesizer and sonification engine. In this way, the queues of these output devices are supplied with data, but are not allowed to overflow or become empty. Nodes are enqueued as a single unit, therefore, splitting character data into multiple nodes, as described above, also helps avoid overflowing the read queue.

When the enqueue cursor reaches the end of the parsed HTML tree, that is, it has returned to the root node of the tree, no more data can be enqueued and the system allows the queues to become empty. As the queues are emptied out, the read cursor is also moved to the end of the parsed HTML tree.

When both cursors are at the end of the tree, the entire document has been sonified and the HTML reader stops. If any user input is received during sonification of a page, the HTIML reader stops reading immediately. It does this by interrupting the speech synthesizer and sonification engine, flushing their queues, and setting the enqueue cursor to the current read cursor position. This causes all sound output to cease. When the reader 14 is started again after the received input is processed, the enqueue cursor is again set to the current read cursor position (in case the read cursor was changed in response to the input), and the enqueuing of data proceeds as described above.

A list of the most recently requested, parsed HTML tree structures and their associated read cursors may be maintained. The user can move linearly from document to document in this list, which provides the "history" of visited HTML documents commonly implemented in browser software. However, by maintaining the read cursor along with each parsed document, when a user switches to another page in the list the invention can continue reading a document from the position at which it stops when last reading that page.

The Navigator

The user is provided with a means for controlling which HTML document and what portion of that document is to be presented to them at any given moment. The user provides some input, which can be in the form of keyboard input, voice commands, or any other kind of input. In the preferred embodiment, the input is from a numeric keypad, such as that on a standard personal computer keyboard. The input selects one of several typical navigation functions, examples of which are described in detail in the appendix. When the navigator 16 receives user input, the reader 14 is stopped, as described above, the function is performed, and the reader is conditionally restarted depending on a Boolean value supplied by the function. In some embodiments, the navigator 16 stops the reader 14, performs the function,. and restarts the reader 14. Alternatively, the navigator 16 may communicate receipt of user input and the command received and the reader 14 may stop itself, perform the function, and restart itself.

Certain functions can generate errors, such as failing to finding a HTML tag for which a function searches. In such cases, the text of an error message is sent to the speech synthesizer for presentation to the user, and the Boolean value returned by the function indicates that the reader 14 should not be restarted.

The present invention may be provided as a software package. In some embodiments the invention may form part of a larger program that includes a browser utility, as well as an Auditory Display Manager. It may be written in any high-level programming language which supports the data structure requirements described above, such as C, C++, PASCAL, FORTRAN, LISP, or ADA. Alternatively, the invention may be provided as assembly language code. The invention, when provided as software code, may be embodied on any non-volatile memory element, such as floppy disk, hard-disk, CD-ROM, optical disk, magnetic tape,. flash memory, or ROM.

EXAMPLE

The following example is meant to illustrate how a simple HTML document might be perceived by a user of the invention. It is not intended to be limiting in any way, but it is provided to solely to illuminate the features of the present invention. The following sample text:

The Hypertext Markup Language (HTML) is a standard proposed by the World Wide Web Consortium (W3C), an international standards body. The current version of the standard is HTML 4.0.

The W3C is-responsible for several other standards, including HTTP and PICS.
could be marked up as a simple HTML document, with hotlinks to other documents, as follows:
  <HTML><BODY>The
  <A HREF="http://www.w3c.org/MarkUp/">Hypertext Markup
  Language (HTML)</A>is a standard proposed by the
  <A HREF="http://www.w3c.org/">World Wide Web Consortium (W3C)</A>, an international standards body.
  The current version of the standard is
  <A HREF="http://www.w3c.org/TR/REC-htm140/">HTML 4.0</A>.
  <P>The W3C is responsible for several other standards, including
  <A HREF="http://www.w3c.org/XML/">XML</A>and
  <A HREF="http://www.w3c.org/PICS/">PICS</A>.
  </BODY></HTML>

How the device 10 sonifies this document depends on its configuration. In one embodiment, the configuration would represent most of the HTML markup using non-speech sounds, and the text using synthesized speech. The speech and non-speech sounds could be produced either sequentially or simultaneously, depending on the preferences of the user. That is, the non-speech sounds could be produced during pauses in the speech stream, or at the same time as words are being spoken.

When the reader 14 begins interpreting the tree data structure representing this exemplary HTML document, it instructs the sonification engine to produce a non-speech sound that represents the beginning of the body of the document, as marked by the <BODY> tag. The exact sound used is immaterial to this patent, but it should represent to the user the concept of starting a document. As the sound is played (or after it ends if the user prefers), the reader 14 enqueues the text at the beginning of the document ("The Hypertext Markup Language...") with the speech synthesis module. As soon as the word "Hypertext" is begun, the reader 14 enqueues the encountered hotlink tag with the sonification engine, causing the sonification engine to produce a sound indicating that the text currently being read aloud is a hotlink to another document, as marked by the <A> tag. In one embodiment, this sound continues to be heard until the end of the hotlink, as marked by the </A> tag, is read. Thus, the user will hear the sound representing the "hotlink" concept while the text of that hotlink is being read. The next phrase ("is a standard...") is read without any nonspeech sound, as there is no markup assigning any special meaning to that text. The next phrase ("World Wide Web...") is read while the hotlink sound is again played, because it is marked up as a hotlink.

Similarly, the next sentence is read with the hotlink sound being produced whenever the text being read is within the <A> and </A> tags.

When the paragraph break represented by the <P> tag is encountered and sent to the sonification engine, the engine produces a different non-speech sound. This sound should represent to the user the idea of a break in the text.

Similarly, the speech synthesizer can be configured to produce a pause appropriate for a paragraph break, and to begin reading the next sentence using prosody appropriate to the beginning of a paragraph. The reading of the next sentence then proceeds similarly to the first sentence, with the hotlink sound being played while the acronyms "XML" and "PICS" are spoken. Finally, a sound representing the end of the document body is played when the </BODY> tag is encountered.

Note that the <HTML> and </HTML> tags are not associated with sounds in this example, because they are generally redundant with the <BODY> and </BODY> tags.

Pauses for commas, periods and other punctuation can be handled by the speech synthesis software without any special control on the part of the invention, but certain kinds of textual constructs common to HTML documents, such as e-mail addresses and Uniform Resource Locators, are treated specially so that the speech synthesizer will read them in a manner expected by the user. Handling these textual constructs is described in greater detail in connection with the section on Textual Mapping Heuristics.

While the document is being read, the user can at any time select a different portion of the document to be read to them. For example, if they want to immediately skip to the second paragraph just after the document begins to be read, they can issue a command which causes the reading to stop and immediately resume just after the <P> tag. If the user's attention wandered briefly and they missed a few words, they can issue a command that causes the invention to back up within the document and re-read the last phrase to them. The user could also invoke any one of the hotlinks as it is being read or soon afterwards to cause a different HTML document to be obtained from the Web and read to them. See the Appendix for an exemplary list of user commands.

Textual Mapping Heuristics

The present invention also provides a means of mapping text from the HTML documents in such a way that it is more understandable when read by the speech synthesizer. Most speech synthesizers contain rules that map text to speech well for general English, but HTML documents contain several constructs that are unknown to most speech synthesizers. Internet e-mail addresses, Uniform Resource Locators (URLs) and various ways of representing textual menus are examples of textual constructs that are read by speech synthesizers in nonsensical or unintelligible ways.

To combat this, the reader 14 replaces text that would be misread with more understandable text before sending it to the speech synthesizer. For example, the e-mail address "info@sonicon.com" will be read as "info sonicon period com" by some speech synthesizers, or completely spelled out as individual letters by others. The reader identifies such constructs and replaces them with "info at sonicon dot com" so that the speech synthesizer will read it in a way the user expects to hear an e-mail address read. Likewise, other constructs, such as computer file pathnames (eg. "/home/fred/documents/plan.doc") are replaced by text similar to the way a person would read the pathname outloud (eg. "slash home slash fred slash documents slash plan dot doc").

The conversion of these phrases is performed using a set of heuristic rules that describe the text to be replaced and how it should be replaced. Many of these rules involve putting whitespace around punctuation and replacing the punctuation with a word in order to ensure it is pronounced.

FUNCTION LIST

In the list of exemplary functions that follows, each is given a name, a description of the input that could be used to invoke that function, whether the reader 14 is restarted after the function, and a description of what the function does.

FUNCTION: FollowLink
INPUT: Enter, Return, '0' (zero) or SpaceBar key
RESTART: TRUE
DESCRIPTION: The HTML anchor, or "A" tag, that precedes the current reading position in the HTML document tree is located and the URL from the HREF attribute of that tag is obtained. In HTML, such tags represent links to other documents. If no such tag exists, an error is generated. A request containing the URL is then sent to the software module that provides HTML documents to the system, causing the document referenced by the URL to be obtained and sent to the parser 16. When the page is completely parsed, the current reading position is at the beginning of the new page, and the function returns TRUE to cause the new page to be read.

The hotlink selected when this function is invoked will be the hotlink that is currently being read to the user, or the one last read if a hotlink is not being read when the function is invoked. Thus the user can follow a hotlink even after the reader 14 has passed it, and may do so at any time until the next hotlink is encountered by the reader.

FUNCTION: Pause
INPUT: '5' or 'P' key
RESTART: FALSE if reading, TRUE if not reading
DESCRIPTION: If the reader 14 was in the process of reading to the user when the user initiated the pause, then this function returns FALSE, otherwise it returns TRUE. This has the effect of toggling the reader 14 on or off.

FUNCTION: Repeat
INPUT: '*' or 'R' key
RESTART: TRUE
DESCRIPTION: The current reading position in the document tree is moved backwards a short distance, usually to the previous tag or sentence break. This has the effect of causing the last phrase the user heard to be repeated to them.

FUNCTION: Forward
INPUT: '6' or Right-Arrow key
RESTART: TRUE
DESCRIPTION: The current reading position in the document tree is moved forwards to the next HTML tag or sentence break. This has the effect of causing the reader 14 to skip a small portion of the document and continue reading slightly further on. Repeatedly invoking this function causes the reader to progressively move forwards through the document.

FUNCTION: Backward
INPUT: '4' or Left-Arrow key
RESTART: TRUE
DESCRIPTION: The current reading position in the document tree is moved backwards two HTML tags or sentence breaks. This has the effect of causing the reader 14 to back up and continue reading from a previous position within the document. Repeatedly invoking this function causes the reader to progressively move backwards through the document.

FUNCTION: ForwardLink
INPUT: '2' or Down-Arrow key, or '8' button on a telephone
RESTART: TRUE
DESCRIPTION: The current reading position in the document tree is moved forwards to the next anchor tag, which is the next link to another document from within the current one. If there is no anchor tag after the current reading position, an error is generated.

FUNCTION: BackwardLink
INPUT: '8' or Up-Arrow key, or '2' button on a telephone
RESTART: TRUE
DESCRIPTION: If the current reading position in the document tree is located within an anchor tag, it is moved backward to the beginning of that tag. The current reading position is then moved backwards to the previous anchor tag, which is the previous link to another document from within the current one. If no such anchor tag can be found, an error is generated.

FUNCTION: BackwardPage
INPUT: '9' or PgUp key, or '3' button on a telephone
RESTART: TRUE
DESCRIPTION: The current document is changed to be the previous document in the list of parsed documents maintained by the invention. The current reading position becomes that of the newly current document. This has the effect of going back to the previous document and reading from where reading of that document was last stopped. If there is no previous document in the list, an error is generated.

FUNCTION: ForwardPage
INPUT: '3' or PgDn key, or '9' button on a telephone
RESTART: TRUE
DESCRIPTION: The current document is changed to be the next document in the list of parsed documents maintained by the invention. The current reading position becomes that of the newly current document. This has the effect of going forward to a document that had been previously obtained and stopped reading by use of the BackwardPage function. If there is no next document in the list, an error is generated.

FUNCTION: BeginningofPage
INPUT: '7' or Home key, or '1' button on a telephone
RESTART: TRUE
DESCRIPTION: The current reading position in the document tree is moved to the root node of the tree, which is the beginning of the document. This causes the document to be reread from the beginning.

FUNCTION: EndOfPage
INPUT: '1' or End key, or '7' button on a telephone
RESTART: TRUE
DESCRIPTION: The current reading position in the document tree is moved to the end of the last tag which is a child of the root node of the tree, which is just before the end of the document. This causes the very end of the document to be read, at which point reading will stop.

FUNCTION: GoToURL
INPUT: 'G' key, or '*' and '7' buttons on a telephone
RESTART: TRUE
DESCRIPTION: The user is prompted to enter a URL of an arbitrary document. A request containing the URL is then sent to the software module that provides documents to the system, causing the document referenced by the URL to be obtained and sent to the parser 16. When the page is completely parsed, the current reading position is at the beginning of the new page, and the function returns TRUE to cause the new page to be read.

The method of entering a URL will vary depending on the system within which the invention is implemented. On a personal computer, the user would enter the URL using a keyboard. On a telephone, they would enter the URL by using some form of character entry method designed for the telephone keypad.

FUNCTION: IdentifyLink
INPUT: 'I' key, or '*' and '1' buttons on a telephone
RESTART: FALSE
DESCRIPTION: The HTML anchor, or "A" tag, that precedes the current reading position in the document tree is located and the URL from the HREF attribute of that tag is obtained. If no such tag exists, an error is generated. The URL is then mapped to a more understandable form as described in the Textual Mapping Heuristics section, and sent to the speech synthesizer to be read to the user. In this way, a user can hear the URL of the document that would be loaded were they to invoke the FollowLink command. Reading is stopped so that the user can chose FollowLink to load the new document, or Pause to continue reading the current one. The user could also invoke any other command at this point.

FUNCTION: ForwardOutline
INPUT: 'Ctrl-Down-Arrow' key, or '*' and '8' buttons on a telephone
RESTART: TRUE
DESCRIPTION: The current reading position in the document tree is moved forwards to the next heading, list, table, list item or paragraph tag. This has the effect of causing the reader 14 to skip forward to the next significant boundary within the document. A well-written document will use these tags to divide the content of the document into sections, and this command allows the user to easily move between such sections.

FUNCTION: BackwardOutline
INPUT: 'Ctrl-Up-Arrow' key, or '*' and '2' buttons on a telephone
RESTART:
DESCRIPTION: The current reading position in the document tree is moved backward to the previous heading, list, table, list item or paragraph tag, then moved backward again to the tag of one of those types previous to that. This has the effect of causing the reader 14 to skip backward to the previous significant boundary within the document. A well-written document will use these tags to divide the content of the document into sections, and this command allows the user to easily move between such sections.

FUNCTION: SpeedUp
INPUT: '+' key, or '*' and '3' buttons on a telephone
RESTART: TRUE
DESCRIPTION: The reading rate of the speech synthesizer, and thus of the entire reader 14 which is synchronized to it, is increased by approximately ten words per minute. This permits users to increase their reading speed.

FUNCTION: SlowDown
INPUT: '−' key, or '*' and '9' buttons on a telephone
RESTART: TRUE
DESCRIPTION: The reading rate of the speech synthesizer, and thus of the entire reader which is synchronized to it, is decreased by approximately ten words per minute. This permits users to decrease their reading speed.

FUNCTION: VolumeUp
INPUT: 'Ctrl +' key, or '#' and '3' buttons on a telephone
RESTART: TRUE
DESCRIPTION: The volume of the speech synthesizer and the non-speech sound playback are both increased slightly. This allows the user to adjust the volume level for comfortable listening.

FUNCTION: VolumeDown
INPUT: 'Ctrl −' key, or '#' and '9' buttons on a telephone
RESTART: TRUE
DESCRIPTION: The volume of the speech synthesizer and the. non-speech sound playback are both decreased slightly. This allows the user to adjust the volume level for comfortable listening.

FUNCTION: SearchText
INPUT: 'F' key, or '*' and '5' buttons on a telephone
RESTART: TRUE
DESCRIPTION: The user is prompted to enter a text string to be searched for within the current document. The document tree is searched for that text string starting from the current reading position and searching forwards. If the text string is not found, a second search is performed starting from the current reading position and searching backwards. If the text string is not found by either search, an error is generated. When found, the current reading position is set to just before the text that was found, so that reading will begin with the text that was searched for. If the user enters an empty text string, then the last string entered as a search string will be used again.

The method of entering a text string will vary depending on the system within which the invention is implemented. On a personal computer, the user would enter the text string using a keyboard. On a telephone, they would enter the text string by using some form of character entry method designed for the telephone keypad.

Although the invention has been described with respect to various embodiments, it should be realized this invention is also capable of a wide variety of further and other embodiments within the spirit and scope of the appended claims.

What is claimed is:

1. A method of representing HTML documents auditorially, the HTML document including text and at least one HTML tag, the method comprising the steps of:
   (a) assigning a sound to an HTNL tag encountered in a document (214);
   (b) producing the assigned sound whenever the HTML tag associated with the sound is encountered (218); and
   (c) producing speech representing text encountered in the HTML document (220).

2. The method of claim 1 wherein steps (b) and (c) occur substantially simultaneously.

3. The method of claim 1 wherein step (c) further comprises (c-a) producing speech representing text encountered in the HTML document; and
   (c-b) including pauses in the speech representing punctuation encountered in the HTML document.

4. The method of claim 1 further comprising the steps of
   (d) accepting input indicating selection of a particular HTML tag;
   (e) auditorially displaying a new HTML document identified by the selected tag.

5. The method of claim 1 further comprising the steps of:
   (f) altering a sound whenever a sound altering HTML tag is encountered; and
   (g) halting a sound whenever a sound halting HTML tag is encountered.

6. The method of claim 1 further comprising the step of replacing a textual construct with a text passage before step (c).

7. The method of claim 6 wherein said replacing step comprises replacing an electronic mail address with a text passage before step (c).

8. A system for representing HTML documents auditorially, the system comprising:
   a parser (12) receiving a HTNL document and outputting a tree representing the received document; and
   a reader (14) using the tree to produce sound representing the text and tags contained in the HTML document.

9. The system of claim 8 wherein said parser produces a tree having at least one node, said at least one node representing a HTML tag.

10. The system of claim 9 wherein tag attributes and tag attribute values are attached to each node.

11. The system of claim 8 wherein textual data contained in the HTML document is represented as leaf nodes of the tree.

12. The system of claim 8 wherein said reader performs a depth-first traversal of the tree to produce sound representing the texts and tags contained in the HTML document.

13. The system of claim 8 further comprising a read cursor indicating the position within the parsed HTML tree that said reader is currently outputting.

14. The system of claim 13 wherein the position of the read cursor can be changed, causing a different position of the parsed HTML document to be output.

15. The system of claim 8 further comprising an enqueue cursor indicating the position within the parsed HTML tree that will be processed for output by said reader.

16. An article of manufacture having computer-readable program means for representing HTML documents auditorially embodied thereon, the HTML document including text and at least one HTML tag, the article of manufacture comprising:
   (a) computer-readable program means (214) for assigning a unique sound to an HTML tag encountered in a document;
   (b) computer-readable program means (218) for producing the assigned sound whenever the HTML tag associated with the sound is encountered; and
   (c) computer-readable program means (220) for producing speech representing text encountered in the HTML document.

17. The article of claim 16 further comprising:
   (d) computer-readable program means for accepting input indicating selection of a particular HTML tag; and
   (e) computer-readable program means for auditorially displaying a new HTML document identified by the selected tag.

* * * * *